(12) United States Patent
Douglas et al.

(10) Patent No.: US 12,093,673 B2
(45) Date of Patent: Sep. 17, 2024

(54) SMART IMAGE REGISTRIES FOR DYNAMIC IMAGE GENERATION

(71) Applicant: Red Hat, Inc., Raleigh, NC (US)

(72) Inventors: Stuart Douglas, Canberra (AU); Marek Goldman, Warsaw (PL)

(73) Assignee: Red Hat, Inc., Raleigh, NC (US)

( * ) Notice: Subject to any disclaimer, the term of this patent is extended or adjusted under 35 U.S.C. 154(b) by 67 days.

(21) Appl. No.: 17/951,928

(22) Filed: Sep. 23, 2022

(65) Prior Publication Data

US 2024/0103823 A1    Mar. 28, 2024

(51) Int. Cl.
*G06F 8/61* (2018.01)
*G06F 8/36* (2018.01)

(52) U.S. Cl.
CPC . *G06F 8/63* (2013.01); *G06F 8/36* (2013.01)

(58) Field of Classification Search
None
See application file for complete search history.

(56) References Cited

U.S. PATENT DOCUMENTS

| | | | |
|---|---|---|---|
| 10,002,247 B2* | 6/2018 | Suarez | G06F 21/31 |
| 10,169,209 B2* | 1/2019 | McPherson | G06F 9/45558 |
| 10,528,366 B2* | 1/2020 | Wong | G06F 9/4493 |
| 10,977,066 B2 | 4/2021 | Griffin et al. | |
| 11,029,975 B2 | 6/2021 | Prasad et al. | |
| 2018/0088926 A1 | 3/2018 | Abrams | |
| 2021/0255840 A1* | 8/2021 | Novy | G06F 8/63 |
| 2022/0147378 A1* | 5/2022 | Tarasov | G06F 9/545 |
| 2022/0197689 A1 | 6/2022 | Hotinger et al. | |
| 2023/0125342 A1* | 4/2023 | Krishna | G06F 16/192 707/639 |

FOREIGN PATENT DOCUMENTS

EP    3945439 A1    2/2022

OTHER PUBLICATIONS

Amazon Web Services, Inc. "Amazon ECR User Guide Container Image Manifest Formats" (2022), 2 pages.
Grunert, Sascha. "Demystifying Containers—Part III: Container Images" (Sep. 17, 2019), 21 pages.

* cited by examiner

*Primary Examiner* — Marina Lee
(74) *Attorney, Agent, or Firm* — Womble Bond Dickinson (US) LLP

(57) ABSTRACT

Systems and methods for generating container images are described. An image definition file specifying a set of packages is received at a virtual image server. The image definition file may specify a set of packages and the virtual image server comprises a mapping of the image definition file to an image file corresponding to each of the set of packages. For each of the set of packages, the corresponding image file may be retrieved from an image registry and used to generate, by the virtual image server, an image manifest that references the corresponding image file for each of the set of packages as a separate image layer. The image manifest is provided to a container host, which may build a container image based on the image manifest.

20 Claims, 7 Drawing Sheets

SMART IMAGE REGISTRIES FOR DYNAMIC IMAGE GENERATION

TECHNICAL FIELD

Aspects of the present disclosure relate to container image generation, and more particularly, to generating container images using layers that can be reshared.

BACKGROUND

A container orchestration engine (such as the Redhat™ OpenShift™ platform) may be a platform for developing and running containerized applications and may allow applications and the data centers that support them to expand from just a few machines and applications to thousands of machines that serve millions of clients. Container orchestration engines comprise a control plane and a cluster of compute nodes on which pods may be scheduled. A pod may refer to one or more containers deployed together on a single host, and is the smallest compute unit that can be defined, deployed, and managed by the control plane. The control plane may include a scheduler that is responsible for scheduling new pods onto compute nodes within the cluster.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Building software in a container-based environment often requires specific sets of packages/tools, and while it is possible to have a single large image file that contains all necessary sets of packages, this approach has significant drawbacks. In addition, having multiple container images each with specific packages also has drawbacks including a large number of container images that must be maintained. Lot of ceremony involved in building images, pushing them to registry, making sure they are up to date.

Container images are built layer by layer, so if multiple packages are installed (each package being a layer of the container image) into a container image, it will result in the creation of a new layer each time, and these individual layers cannot be shared with other images. Only the content from a single container image may be reused, and this is because each layer will have its own unique hash and thus the whole container image must be copied around each time even if the contents are the same.

The present disclosure addresses the above-noted and other deficiencies by providing a virtual image server that behaves as a smart container registry that builds container images on the fly using existing image files, instead of building a container image and pushing it to the image registry. The smart container registry may generate image manifests on the fly for a container image based on image definition files that define the packages that the container image needs. A package/tooling provider may provide a set of image definition files, each of the set of image definition files specifying a particular combination of packages. The package/tooling provider may provide the image definition files to the virtual image server, which may maintain a mapping of image definition files to corresponding image files stored in an image registry. When the name of an image definition file is received by the virtual image server, the virtual image server may pull the image file corresponding to each package specified in the image definition file from the image registry. The virtual image server may generate a manifest referencing each of these existing image files as a separate layer having its own isolated file path, and upload the manifest to the image registry as well as provide the manifest to a user. Because the manifest references existing layers, when a subsequent manifest referencing one or more of the same layers is received, the identifiers of those one or more same layers will be the same. This in turn means that generation of a new layer is not required and the system does not have to spend the resources transferring binary content corresponding to those one or more same layers over the network. This also ensures that a user will always get the most up to date version of an image file.

Figure 1:
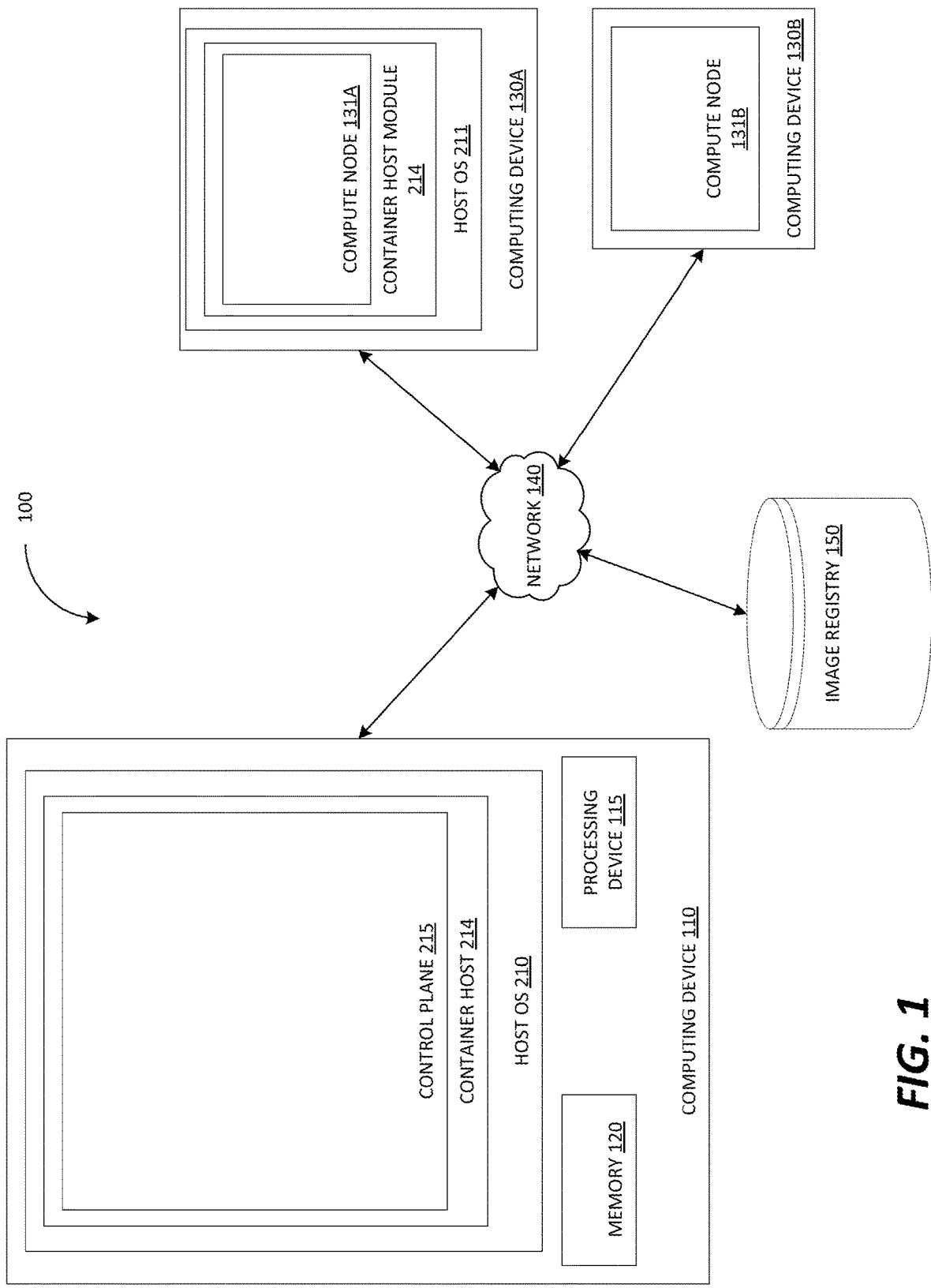
FIG. 1 is a block diagram that illustrates an example system, in accordance with some embodiments of the present disclosure.

FIG. 1 is a block diagram that illustrates an example system 100. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110, image registry 150, and computing devices 130. Each computing device may include hardware such as processing device 115 (e.g., processors, central processing units (CPUs), memory 120 (e.g., random access memory 120 (e.g., RAM), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110.

Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 210 and host OS 211 of computing device 110 and 130A respectively, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 130 may each implement a compute node (e.g., as part of the container orchestration engine).

In some embodiments, a container orchestration engine 214 (referred to herein as container host 214), such as the Redhat™ OpenShift™ module, may execute on the host OS 210 of computing device 110 and the host OS 211 of computing device 130A, as discussed in further detail herein. The container host 214 may be a platform for developing and running containerized applications and may allow applications and the data centers that support them to expand from just a few machines and applications to thousands of machines that serve millions of clients. Container host 214 may provide an image-based deployment module for creating containers and may store one or more image files for creating container instances. Many application instances can be running in containers on a single host without visibility into each other's processes, files, network, and so on. In some embodiments, each container may provide a single function (often called a "micro-service") or component of an application, such as a web server or a database, though containers can be used for arbitrary workloads. In this way, the container host 214 provides a function-based architecture of smaller, decoupled units that work together.

In some embodiments, the container host 214 may allow different containers to share the host OS 210 (including e.g., the OS kernel as well as packages including any associated libraries, binary and/or source files etc.) of the computing device 110. For example, the container host 214 may multiplex the packages of the host OS 210 between multiple containers. The container host 214 may also facilitate interactions between a container (not shown) and the resources of the computing device 110. For example, the container host 214 may manage requests from the container to access a memory (e.g., a RAM) of the computing device 110. In another example, the container host 214 may manage requests from the container to access certain packages of the host OS 210. The container host 214 may also create, remove, and manage containers. In one embodiment, the container host 214 may be a component of the host OS 210 (e.g., Red Hat™ Enterprise Linux). In another embodiment, container host 214 may run on top of the host OS 210, or may run directly on host hardware without the use of the host OS 210. In yet other embodiments, container host 214 may be a component of a network virtualization platform (not shown), such as the RedHat™ OpenStack™ platform for example, that runs on host OS 210. Container host 214 may include software or logic to build a container using a container image such as a docker file.

A typical deployment of the container host 214 may include a control plane 215 and a cluster of compute nodes 131, including compute nodes 131A and 131B (also referred to as compute machines). The compute nodes 131 may run the aspects of the container host 214 that are needed to launch and manage containers, pods, and other objects. For example, a worker node may be a physical server that provides the processing capabilities required for running containers in the environment. A worker node may also be implemented as a virtual server, logical container, or GPU, for example.

Container host 214 may include a storage driver (not shown), such as OverlayFS, to manage the contents of a container image including the read only and writable layers of the container image. The storage driver may be a type of union file system which allows a developer to overlay one file system on top of another. Changes may be recorded in the upper file system, while the lower file system (base image) remains unmodified. In this way, multiple containers may share a container image where the base image is read-only media.

Figure 2:
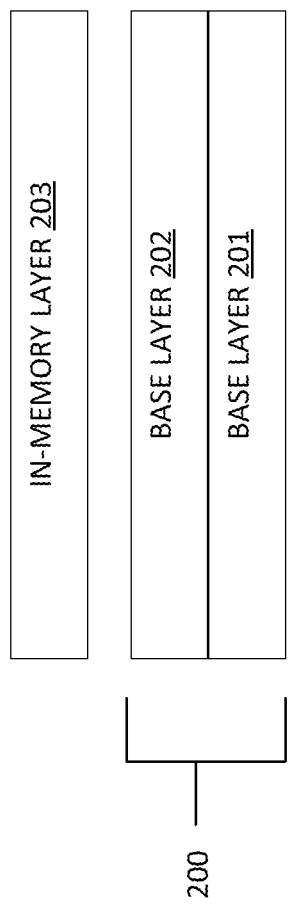
FIG. 2 is a block diagram that illustrates the layers of a container, in accordance with some embodiments of the present disclosure.

Container images may be stored within the image registry 150. The image registry 150 may be e.g., a registry server that may store container images (e.g., docker images), as discussed in further detail herein. FIG. 2 illustrates an example container image 200 that a container may be generated from using the overlay FS. The container image 200 may include base layers 201 and 202, each of which may correspond to an image file themselves. Container image 200 may be shared by multiple containers. When the container host 214 (via Overlay FS) creates a new container, it may schedule the container to a compute node 131 which may retrieve the container image 200 for the container (or any base layers required to complete the container image 200) e.g., from the image registry 150. The container host 214 may add a new writable (e.g., in-memory) layer on top of the underlying base layers 201 and 202. This new writable layer is illustrated as the in-memory layer 203 in FIG. 2. When the container is deleted, the in-memory layer 203 is also deleted. However, the underlying container image 200 remains unchanged. Although illustrated as having two base layers for simplicity, container image 200 may include any suitable number of base layers (image files). Base layers may define the runtime environment as well as the packages necessary for a containerized application to run. Any changes (e.g., data to be written by the application running on the container) may be implemented in subsequent (upper)

layers such as the in-memory layer. Changes made in the in-memory layer may be saved by creating a new layered image.

However, as discussed hereinabove, building software in a container-based environment often requires specific sets of packages/tools, and while it is possible to have a single large image file that contains all necessary sets of packages, this approach has significant drawbacks. In addition, having multiple container images each with specific packages also has drawbacks including a large number of container images that must be maintained.

Figure 3A:
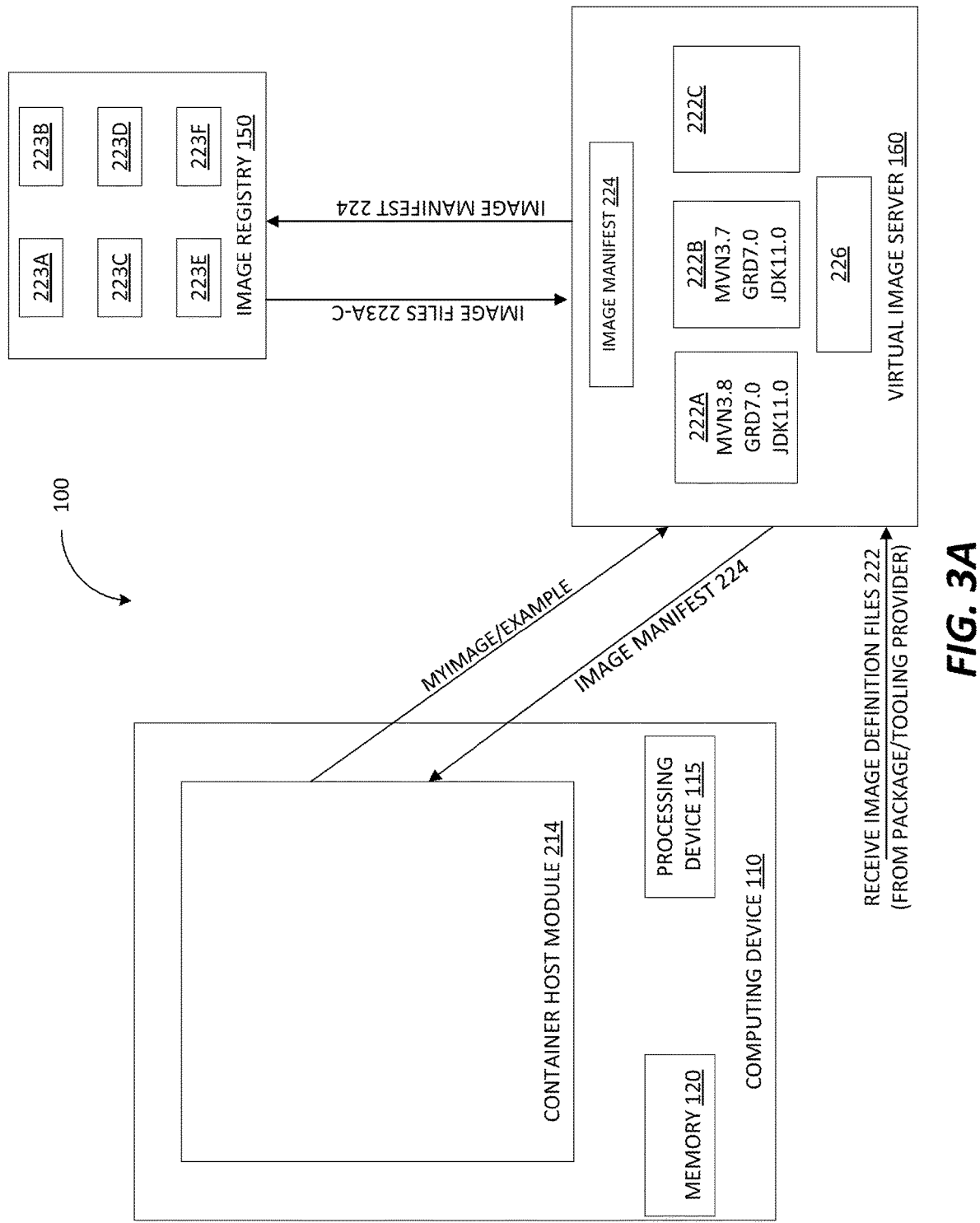
FIG. 3A is a block diagram that illustrates an example system for dynamically generating container images, in accordance with some embodiments of the present disclosure.

FIG. 3A illustrates the system 100 in accordance with some embodiments of the present disclosure. As shown, image registry 150 may include a plurality of image files 223, each of which may correspond to a particular package and may be maintained in isolation. More specifically, each of the image files 223 may correspond to a binary blob, resulting in a plurality of binary blobs. Each binary blob may represent the actual image contents/binary contents of the corresponding image file 223. Each binary blob may include files inside a specific isolated directory that the corresponding image file 223 owns. The image registry may store each of the image files 223 along with an identifier that can be used to reference the image file 223. The identifier of each image file 223 may comprise any appropriate type of reference e.g., a hash referencing the image file 223 or a name of the image file 223.

In the example of FIG. 3A, the image file 223A may correspond to version 3.8 of the Maven package (MVN3.8), the image file 223B may correspond to version 7.0 of the Gradle package (GRD7.0), and the image file 223C may correspond to version 11.0 of the Java development kit (JDK) package (JDK11.0). The system 100 may further include a virtual image server 160. The virtual image server 160 may be implemented on a computing device similar to computing device 110 or computing device 130 and may act as a smart container registry that builds container images on the fly using existing image files, instead of building a container image and pushing it to the image registry. The smart container registry may generate image manifests on the fly for a container image based on an image definition file that defines the image files/packages that the container image needs. A package/tooling provider (not shown) may define a set of image definition files 222A-C, each image definition file specifying a set of packages required to generate a particular container image, and may upload the set of image definition files 222A-C to the virtual image server 160. Each image definition file 222 may have a name and may be any appropriate type of file (e.g., a JSON file or a text file). In some embodiments, each image definition file 222 may comprise an identifier and a version number for each of the set of packages it specifies.

In the example of FIG. 3A, the image definition file 222A may be named "myimage/example" and may specify version 3.8 of the Maven package, version 7.0 of the Gradle package, and version 11.0 of the JDK package (abbreviated as JDK11.0-MVN3.8-GRD7.0) as the packages required to generate the myimage/example container image. The image definition file 222B may be named "myimage2/second example" and may specify JDK11.0-MVN3.7-GRD7.0 as the packages required to generate the myimage2/second example container image. Once the set of image definition files 222A-C has been uploaded by the package/tooling provider to the virtual image server 160 (see FIG. 3C), the virtual image server 160 may store the set of image definition files 222A-C along with a mapping 226 of each image definition file 222 to a version tag of an image file 223 corresponding to each of the packages specified by the image definition file 222.

A version tag may be a tool for container image builders to communicate to container image consumers which layers are best to consume and are often used to designate versions of software within the container image. The version tag of each image file 223 may refer to the latest version of the package the image file 223 corresponds to and may be updated whenever the package the image file 223 corresponds to is updated. In this way, the virtual image server 160 may ensure that it is always pulling the latest version of an image file 223.

When a user wishes to obtain a container image based on an image definition file 222, they may provide, via the container host 214, the name of the corresponding image definition file 222 to the virtual image server 160. Continuing to refer FIG. 3A, the container host 214 may provide the name myimage/example to the virtual image server 160 when the user wishes to obtain the myimage/example container image. The virtual image server 160 may receive the name myimage/example and may utilize the mapping 226 to pull from image registry 150, each of the image files 223A-C (which correspond to the latest version of the packages specified by the image definition file 222A i.e., MVN3.8, and GRD7.0, and JDK11.0 respectively).

Once the image registry 150 has served the image files 223A-C, the virtual image server 160 may then dynamically generate an image manifest 224 corresponding to the myimage/example container image. As part of this process, the virtual image server 160 may extract a manifest from each of the image files 223A-C and may use the pulled manifests for each of the image files 223A-C to generate the image manifest 224 which references the requested image files 223A-C. More specifically, the image manifest 224 may reference the identifier of the specific version of each of the image files 223A-C that was retrieved from the image registry 150. As used herein, dynamically generating an image manifest may refer to generating the image manifest "on the fly," or in an ad-hoc manner.

When the container host 214 builds a container image in the traditional manner, it may layer each component image file (base layer) on top of each other in a particular order as specified by an image manifest of the container image. The image manifest may provide the configuration and necessary set of component image files for the container image. Each of the component image files may correspond to a binary blob that contains the actual image contents. Each binary blob may comprise e.g., a TAR archive or any appropriate file in which the actual image contents may be stored. The image manifest of the container image may reference the component image files in order, and the component image files may be combined in the specified order resulting in a container image (and thus, a single binary blob). As a result, if a base layer/component image file of the container image is changed, all subsequent higher layers must be changed, resulting in a whole new container image build. This means that if a user builds the myimage/example container image (based on JDK11.0-MVN3.8-GRD7.0) and the myimage2/second example container image (based on JDK11.0-MVN3.7-GRD7.0) in the traditional manner, the myimage/example container image would have a first identifier (e.g., hash) and the myimage2/second example container image would have a second identifier. Therefore, the binary content corresponding to the JDK11.0 and GRD7.0 components would need to be downloaded twice (once for each container image), even though they are the same component and version number.

However, assembly of a container image in accordance with embodiments of the present disclosure does not result in the creation of a whole new binary blob that must be downloaded in its entirety each time. Instead, image file 223A-C (and their corresponding binary content) can be requested and served in any combination that is defined by an image definition file 222. This provides a significant amount of flexibility as package/tooling providers can define large numbers of image definition files representing a variety of different package combinations.

As discussed hereinabove, each image file 223 is stored in an isolated directory, with an individual identifier. The image manifest 224 may reference the identifier for each image file 223A-C as a separate image layer (as opposed to referencing the image files 223A-C together in a particular order as a single layer), where each image file 223A-C has its own isolated directory. Because each of the image files 223 may correspond to a binary blob, the image manifest 224 may effectively reference the binary blob corresponding to each of the image files 223A-C as a separate layer that only includes files inside a specific directory that the image file 223 owns. In this way, when the container host 214 is building the myimage/example container image using the image manifest 224, the image manifest 224 may prevent binary blobs corresponding to image files 223A-C from interfering with each other as the binary blob for every requested image file 223A-C will be in a path that is unique and distinct, and will not overlap with the path of a binary blob for another requested image file 223A-C. Indeed, because the image manifest 224 is referencing existing image files 223 having binary content stored in isolated directories, the identifier for each image file 223 will be the same every time a container image including the image file 223 is requested, thus eliminating the requirement to transfer the binary content of an image file 223 that has already been downloaded (i.e., an image file for which there is already a reference).

This allows for image files 223A-C to be shared and reused, while providing the end user with a significant amount of flexibility in terms of image files 223 that they wish to request (i.e., any combination of image files 223 that is embodied by an image definition file). In addition, because each image file 223A-C only includes files inside a specific directory that the image file 223 owns, the order in which the image files 223A-C are layered when building a container using the image manifest 224 does not matter and the image manifest 224 does not specify (or need to specify) an order.

The image manifest 224 may look and behave like an actual container image even though it is dynamically generated. Thus, the use of the virtual image server 160 may be transparent to the user and the user does not know whether they have connected to the virtual image server 160 where content is generated on the fly, or to the image registry 150 (which is a traditional image registry). The virtual image server 160 may push the image manifest 224 to the image registry 150, so that the image manifest 224 can be referenced (e.g., by its identifier) later as it is stored in the image registry 150. The virtual image server 160 may also provide the image manifest 224 to the container host 214.

Figure 3B:
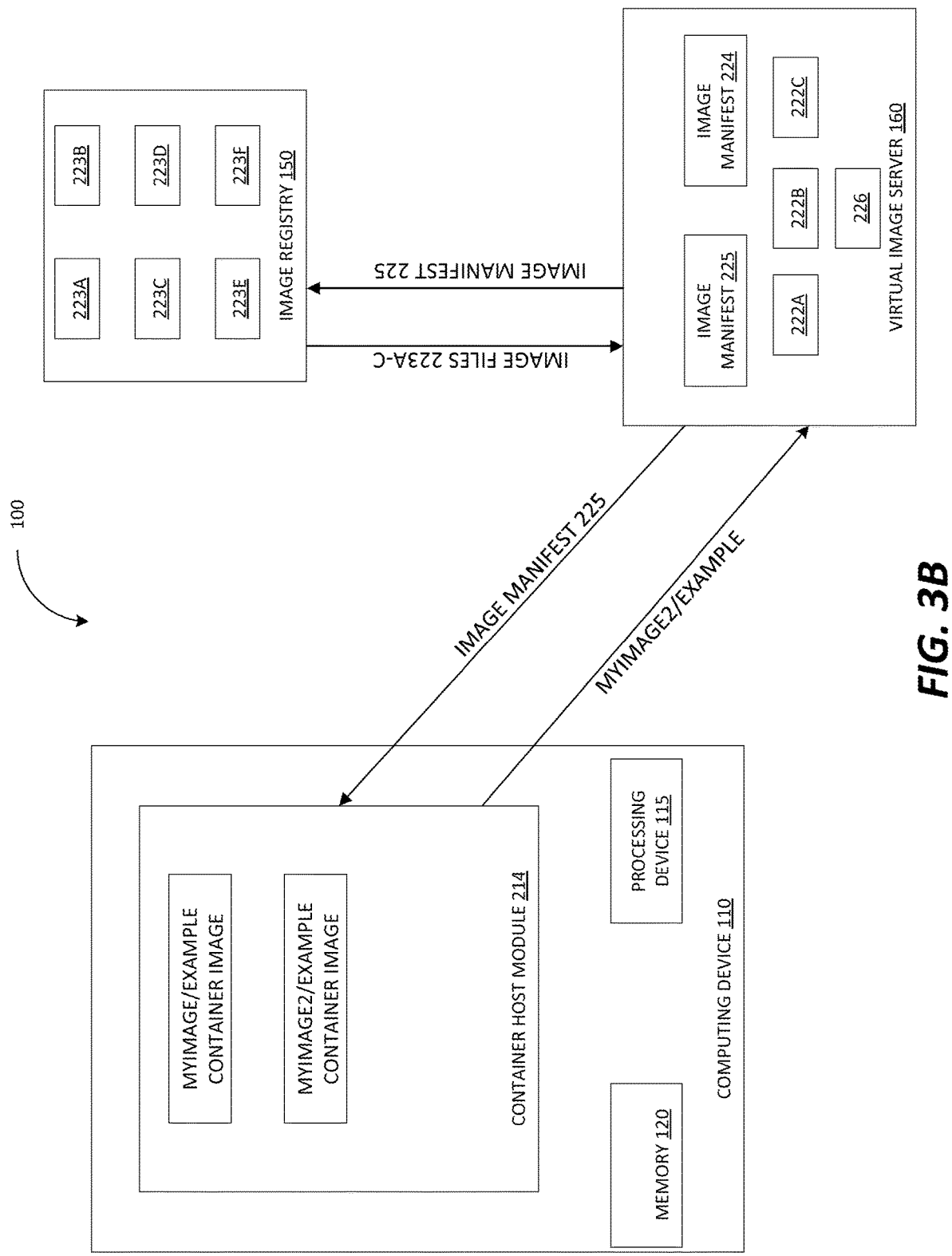
FIG. 3B is a block diagram that illustrates an example system for dynamically generating container images, in accordance with some embodiments of the present disclosure.
Figure 3C:
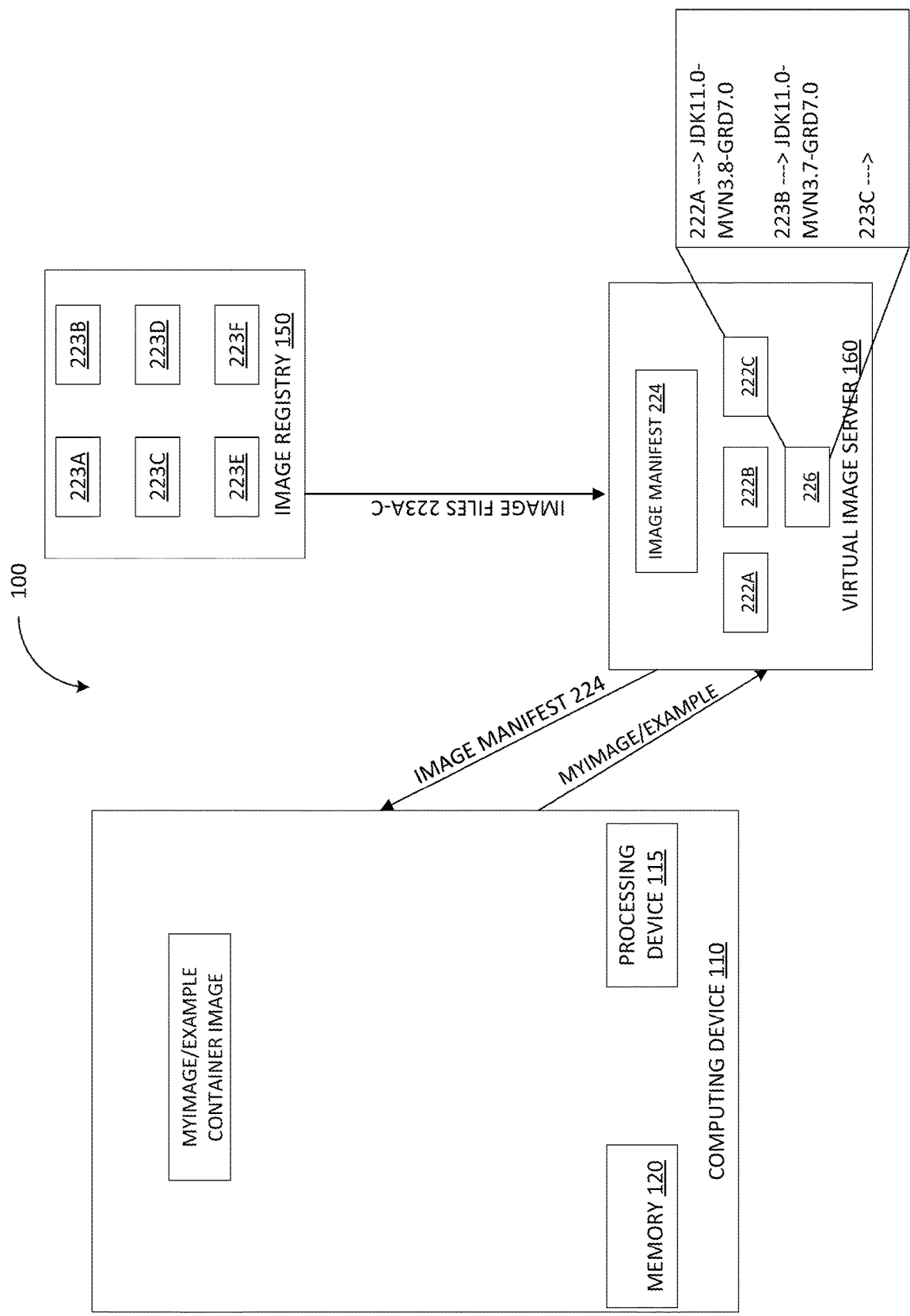
FIG. 3C is a block diagram that illustrates an example system for dynamically generating container images, in accordance with some embodiments of the present disclosure.

In this way, if a user wishes to pull the myimage/example container image as well as the myimage2/second example container image, the virtual image server 160 may generate the image manifest 224, push the image manifest 224 to the image registry 150, and provide the image manifest 224 to the user (i.e., container host 214). The container host 214 may use the image manifest 224 to obtain the corresponding binary content for image files 223A-C as individual layers as discussed herein. In some embodiments, the corresponding binary content may be redirected or proxied through the virtual image server 160 from the image registry 150. The container host 214 may then build the myimage/example container image using the obtained binary content corresponding to JDK11.0-MVN3.8-GRD7.0. Referring to FIG. 3B, the virtual image server 160 may then dynamically generate an image manifest 225 for the myimage2/second example container image based on the JDK11.0-MVN3.7-GRD7.0 package combination specified by image definition file 222B in the same manner as image manifest 224 discussed above with respect to FIG. 3A, push the image manifest 225 to the image registry 150, and provide the image manifest 225 to the client (i.e., container host 214). When building the myimage2/second example container image, the logic of the container host 214 for building container images may recognize that the image manifest 225 generated for the myimage2/second example container image as well as the image manifest 224 generated for the myimage/example container image each include a reference to the same identifier (e.g., hash) for the JDK11.0 and GRD7.0 image files (223B and 223C). As a result, the container host 214 will only download the binary content corresponding to image file 223A (MVN3.7) when building the myimage2/second example container image.

In some embodiments, specific directories for each package are not required. For example, in scenarios where each package is a single file, they may share a directory since uniqueness could be achieved on the file level. In another example, two or more directories may be provided, with some packages in e.g., the "/opt/feature1/*" directory and some packages in e.g., the "/lib/feature1/*" directory. Essentially, there is some form of naming scheme that guarantees uniqueness (e.g. a unique prefix) for each package.

Figure 4:
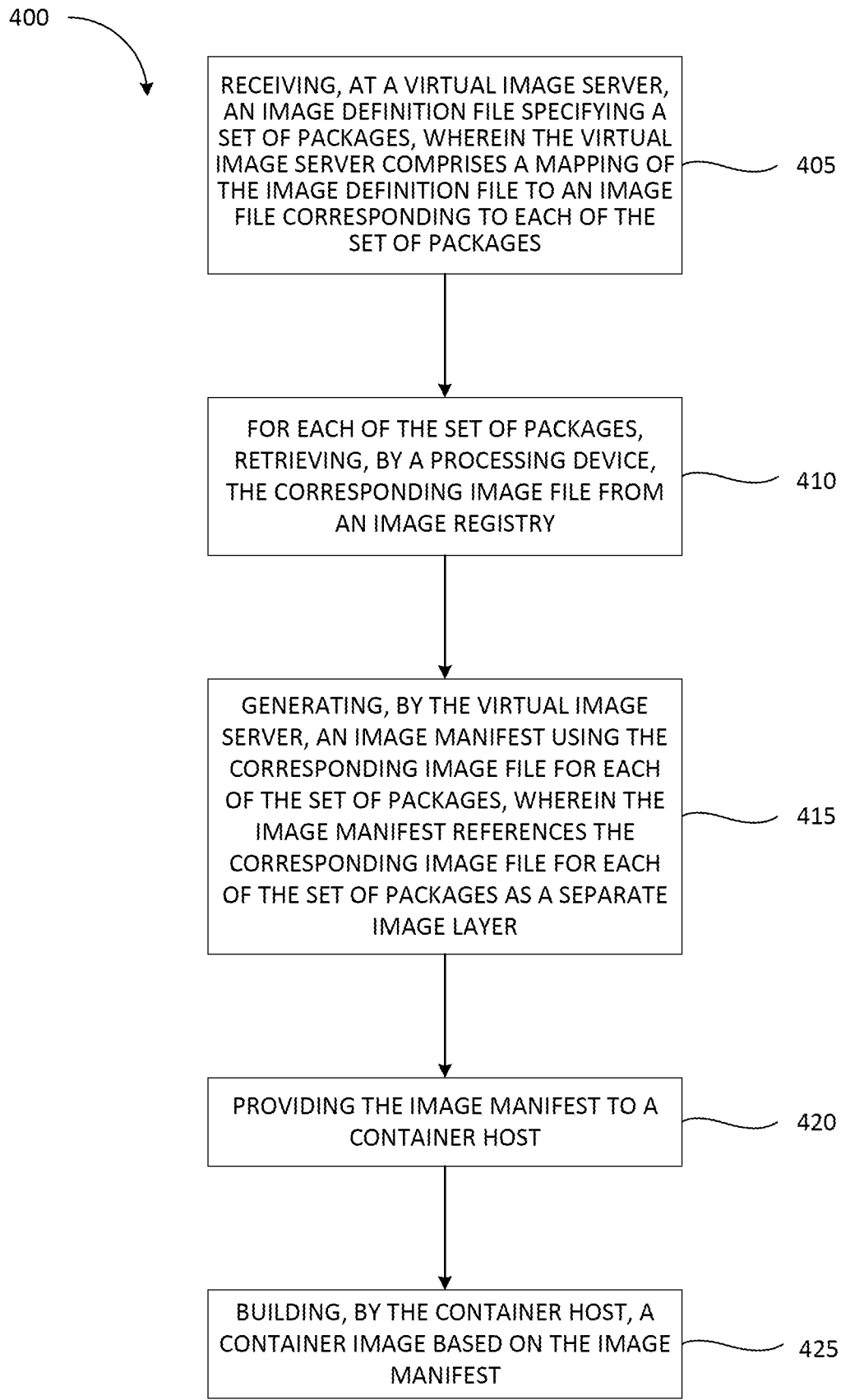
FIG. 4 is a flow diagram of a method for dynamically generating container images, in accordance with some embodiments of the present disclosure.

FIG. 4 is a flow diagram of a method 400 for building container images, in accordance with some embodiments of the present disclosure. The method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. in some embodiments, the method 400 may be performed by a computing device (e.g., computing device 110 and virtual image server 160 illustrated in FIGS. 3A-3C).

A package/tooling provider (not shown) may define a set of image definition files 222A-C, each image definition file specifying a set of packages required to generate a particular container image, and may upload the set of image definition files 222A-C to the virtual image server 160. Each image definition file 222 may have a name and may be any appropriate type of file (e.g., a JSON file or a text file). In some embodiments, each image definition file 222 may comprise an identifier and a version number for each of the set of packages it specifies.

In the example of FIG. 3A, the image definition file 222A may be named "myimage/example" and may specify version 3.8 of the Maven package, version 7.0 of the Gradle package, and version 11.0 of the JDK package (abbreviated as JDK11.0-MVN3.8-GRD7.0) as the packages required to generate the myimage/example container image. The image definition file 222B may be named "myimage2/second example" and may specify JDK11.0-MVN3.7-GRD7.0 as the packages required to generate the myimage2/second example container image. Once the set of image definition files 222A-C has been uploaded by the package/tooling provider to the virtual image server 160 (see FIG. 3C), the virtual image server 160 may store the set of image definition files 222A-C along with a mapping 226 of each image definition file 222 to a version tag of an image file 223 corresponding to each of the packages specified by the image definition file 222.

When a user wishes to obtain a container image based on an image definition file 222, they may provide, via the container host 214, the name of the corresponding image definition file 222 to the virtual image server 160. Referring to FIG. 3A, at block 405 the virtual image server 160 may receive the name myimage/example from the container host 214. At block 410, the virtual image server 160 may utilize the mapping 226 to pull from image registry 150, each of the image files 223A-C (which correspond to the latest version of the packages specified by the image definition file 222A i.e., MVN3.8, and GRD7.0, and JDK11.0 respectively).

Once the image registry 150 has served the image files 223A-C, at block 415 the virtual image server 160 may then dynamically generate an image manifest 224 corresponding to the myimage/example container image. As part of this process, the virtual image server 160 may extract a manifest from each of the image files 223A-C and may use the pulled manifests for each of the image files 223A-C to generate the image manifest 224 which references the requested image files 223A-C. More specifically, the image manifest 224 may reference the identifier of the specific version of each of the image files 223A-C that was retrieved from the image registry 150.

The image manifest 224 may look and behave like an actual container image even though it is dynamically generated. Thus, the use of the virtual image server 160 may be transparent to the user and the user does not know whether they have connected to the virtual image server 160 where content is generated on the fly, or to the image registry 150 (which is a traditional image registry). The virtual image server 160 may push the image manifest 224 to the image registry 150, so that the image manifest 224 can be referenced (e.g., by its identifier) later as it is stored in the image registry 150. At block 420, the virtual image server 160 may also provide the image manifest 224 to the container host 214.

As discussed hereinabove, each image file 223 is stored in an isolated directory, with an individual identifier. The image manifest 224 may reference the identifier for each image file 223A-C as a separate image layer (as opposed to referencing the image files 223A-C together in a particular order as a single layer), where each image file 223A-C has its own isolated directory. Because each of the image files 223 may correspond to a binary blob, the image manifest 224 may effectively reference the binary blob corresponding to each of the image files 223A-C as a separate layer that only includes files inside a specific directory that the image file 223 owns. In this way, when the container host 214 is building the myimage/example container image at block 425 using the image manifest 224, the image manifest 224 may prevent binary blobs corresponding to image files 223A-C from interfering with each other as the binary blob for every requested image file 223A-C will be in a path that is unique and distinct, and will not overlap with the path of a binary blob for another requested image file 223A-C. Indeed, because the image manifest 224 is referencing existing image files 223 having binary content stored in isolated directories, the identifier for each image file 223 will be the same every time a container image including the image file 223 is requested, thus eliminating the requirement to transfer the binary content of an image file 223 that has already been downloaded (i.e., an image file for which there is already a reference).

This allows for image files 223A-C to be shared and reused, while providing the end user with a significant amount of flexibility in terms of image files 223 that they wish to request (i.e., any combination of image files 223 that is embodied by an image definition file). In addition, because each image file 223A-C only includes files inside a specific directory that the image file 223 owns, the order in which the image files 223A-C are layered when building a container using the image manifest 224 does not matter and the image manifest 224 does not specify (or need to specify) an order.

In this way, if a user wishes to pull the myimage/example container image as well as the myimage2/second example container image, the virtual image server 160 may generate the image manifest 224, push the image manifest 224 to the image registry 150, and provide the image manifest 224 to the user (i.e., container host 214). The container host 214 may use the image manifest 224 to obtain the corresponding binary content for image files 223A-C as individual layers as discussed herein. In some embodiments, the corresponding binary content may be redirected or proxied through the virtual image server 160 from the image registry 150. The container host 214 may then build the myimage/example container image using the obtained binary content corresponding to JDK11.0-MVN3.8-GRD7.0. Referring to FIG. 3B, the virtual image server 160 may then dynamically generate an image manifest 225 for the myimage2/second example container image based on the JDK11.0-MVN3.7-GRD7.0 package combination specified by image definition file 222B in the same manner as image manifest 224 discussed above with respect to FIG. 3A, push the image manifest 225 to the image registry 150, and provide the image manifest 225 to the client (i.e., container host 214). When building the myimage2/second example container image, the logic of the container host 214 for building container images may recognize that the image manifest 225 generated for the myimage2/second example container image as well as the image manifest 224 generated for the myimage/example container image each include a reference to the same identifier (e.g., hash) for the JDK11.0 and GRD7.0 image files (223B and 223C). As a result, the container host 214 will only download the binary content corresponding to image file 223A (MVN3.7) when building the myimage2/second example container image.

Figure 5:
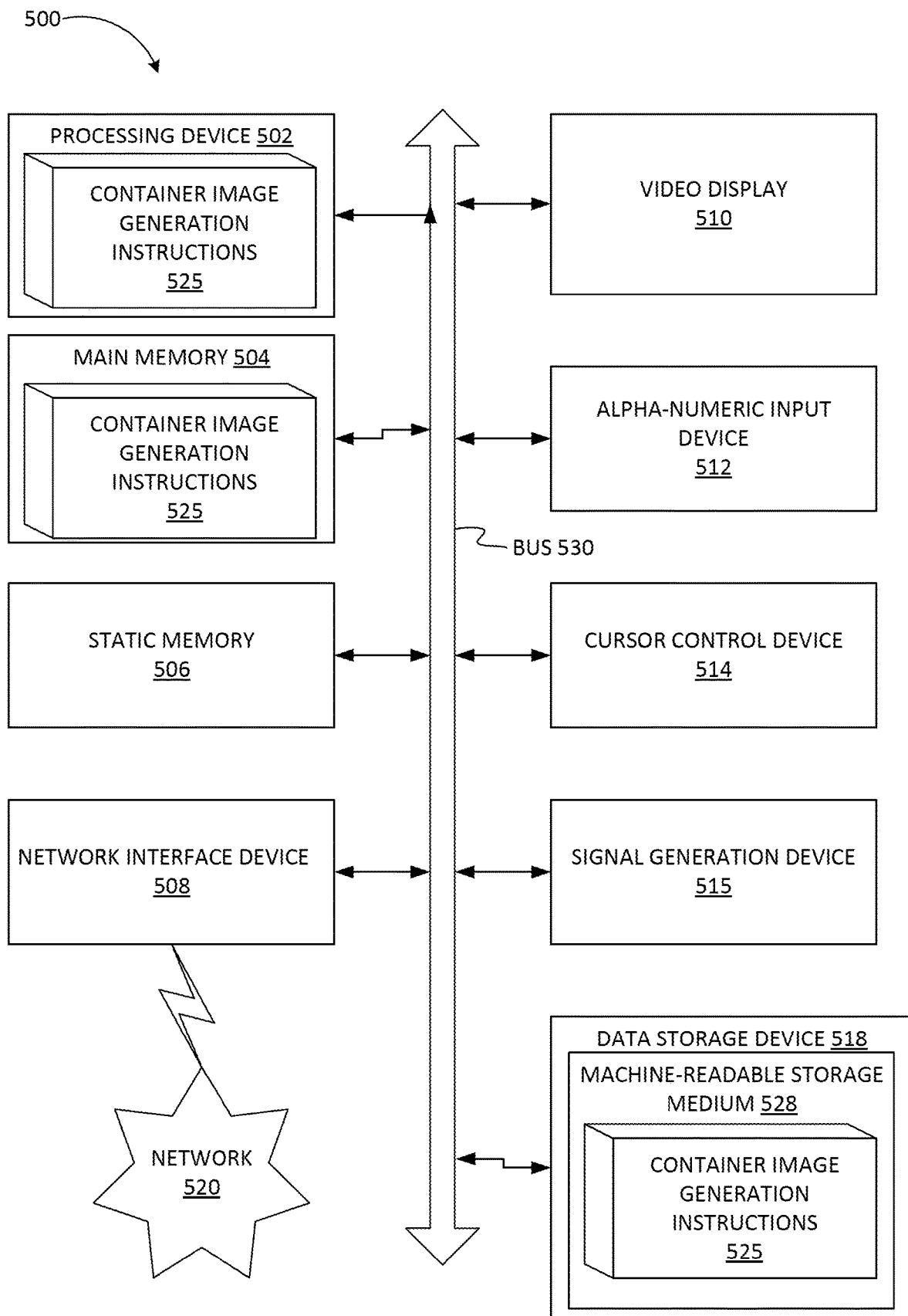
FIG. 5 is a block diagram of an example computing device that may perform one or more of the operations described herein, in accordance with some embodiments of the present disclosure.

FIG. 5 illustrates a diagrammatic representation of a machine in the example form of a computer system 500 within which a set of instructions, for causing the machine to perform any one or more of the methodologies discussed herein for generating container images.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518 which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute container image generation instructions 525, for performing the operations and steps discussed herein.

The data storage device 518 may include a machine-readable storage medium 528, on which is stored one or more sets of container image generation instructions 525 (e.g., software) embodying any one or more of the methodologies of functions described herein. The container image generation instructions 525 may also reside, completely or at least partially, within the main memory 504 or within the processing device 502 during execution thereof by the computer system 500; the main memory 504 and the processing device 502 also constituting machine-readable storage media. The container image generation instructions 525 may further be transmitted or received over a network 520 via the network interface device 508.

The machine-readable storage medium 528 may also be used to store instructions to perform a method for generating container images, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    receiving, at a virtual image server, an image definition file specifying a set of packages to build a container image, wherein the virtual image server comprises a mapping of the image definition file to an image file corresponding to each of the set of packages;
    for each of the set of packages, retrieving, by the virtual image server, the corresponding image file from an image registry;
    generating, by the virtual image server, an image manifest using the corresponding image file for each of the set of packages, wherein the image manifest references the corresponding image file for each of the set of packages as a separate image layer;
    providing the image manifest to a container host; and
    building, by the container host, the container image based on the image manifest.

2. The method of claim 1, further comprising:
    retrieving, using the image manifest, binary content associated with the corresponding image file for each of the set of packages from the image registry, wherein the image registry stores the binary content associated with the corresponding image file for each of the set of packages inside a specific isolated directory that the corresponding image file owns, and wherein the container image is built using the binary content associated with the corresponding image file for each of the set of packages.

3. The method of claim 1, wherein the image manifest references an identifier of the corresponding image file for each of the set of packages.

4. The method of claim 2, further comprising:
    receiving, at the virtual image server, a second image definition file specifying a second set of packages;
    generating a second image manifest using a second corresponding image file for each of the second set of packages, wherein the second image manifest references a second identifier of the second corresponding image file for each of the second set of packages as a separate image layer;
    providing the second image manifest to the container host; and
    for the second corresponding image file for each of the second set of packages, retrieving binary content associated with the second corresponding image file if a second identifier of the second corresponding image file does not match an identifier of a corresponding image file for any of the set of packages.

5. The method of claim 3, wherein the identifier of the corresponding image file of each of the set of packages comprises a hash.

6. The method of claim 1, wherein the image manifest does not reference the corresponding image file for each of the set of packages in an order.

7. The method of claim 2, wherein retrieving the binary content associated with the corresponding image file for each of the set of packages comprises:
    redirecting the binary content associated with the corresponding image file for each of the set of packages through the virtual image server to the container host.

8. A system comprising:
    a memory; and
    a processing device operatively coupled to the memory, the processing device to:
        receive, at a virtual image server, an image definition file specifying a set of packages to build a container image, wherein the virtual image server comprises a mapping of the image definition file to an image file corresponding to each of the set of packages;
        for each of the set of packages, retrieve, by the virtual image server, the corresponding image file from an image registry;
        generate, by the virtual image server, an image manifest using the corresponding image file for each of the set of packages, wherein the image manifest references the corresponding image file for each of the set of packages as a separate image layer;

provide the image manifest to a container host; and build, by the container host, a container image based on the image manifest.

9. The system of claim 8, wherein the processing device is further to:

retrieve, using the image manifest, binary content associated with the corresponding image file for each of the set of packages from the image registry, wherein the image registry stores the binary content associated with the corresponding image file for each of the set of packages inside a specific isolated directory that the corresponding image file owns, and wherein the container image is built using the binary content associated with the corresponding image file for each of the set of packages.

10. The system of claim 8, wherein the image manifest references an identifier of the corresponding image file for each of the set of packages.

11. The system of claim 9, wherein the processing device is further to:

receive, at the virtual image server, a second image definition file specifying a second set of packages;

generate a second image manifest using a second corresponding image file for each of the second set of packages, wherein the second image manifest references a second identifier of the second corresponding image file for each of the second set of packages as a separate image layer;

provide the second image manifest to the container host; and for the second corresponding image file for each of the second set of packages, retrieve binary content associated with the second corresponding image file if a second identifier of the second corresponding image file does not match an identifier of a corresponding image file for any of the set of packages.

12. The system of claim 10, wherein the identifier of the corresponding image file of each of the set of packages comprises a hash.

13. The system of claim 8, wherein the image manifest does not reference the corresponding image file for each of the second set of packages in an order.

14. The system of claim 9, wherein to retrieve the binary content associated with the corresponding image file for each of the set of packages, the processing device is to:

redirect the binary content associated with the corresponding image file for each of the set of packages through the virtual image server to the container host.

15. A non-transitory computer-readable medium having instructions stored thereon which, when executed by a processing device, cause the processing device to:

receive, at a virtual image server, an image definition file specifying a set of packages to build a container image, wherein the virtual image server comprises a mapping of the image definition file to an image file corresponding to each of the set of packages;

for each of the set of packages, retrieve, by the virtual image server, the corresponding image file from an image registry;

generate, by the virtual image server, an image manifest using the corresponding image file for each of the set of packages, wherein the image manifest references the corresponding image file for each of the set of packages as a separate image layer;

provide the image manifest to a container host; and build, by the container host, a container image based on the image manifest.

16. The non-transitory computer-readable medium of claim 15, wherein the processing device is further to:

retrieve, using the image manifest, binary content associated with the corresponding image file for each of the set of packages from the image registry, wherein the image registry stores the binary content associated with the corresponding image file for each of the set of packages inside a specific isolated directory that the corresponding image file owns, and wherein the container image is built using the binary content associated with the corresponding image file for each of the set of packages.

17. The non-transitory computer-readable medium of claim 15, wherein the image manifest references an identifier of the corresponding image file for each of the set of packages.

18. The non-transitory computer-readable medium of claim 16, wherein the processing device is further to:

receive, at the virtual image server, a second image definition file specifying a second set of packages;

generate a second image manifest using a second corresponding image file for each of the second set of packages, wherein the second image manifest references a second identifier of the second corresponding image file for each of the second set of packages as a separate image layer;

provide the second image manifest to the container host; and for the second corresponding image file for each of the second set of packages, retrieve binary content associated with the second corresponding image file if a second identifier of the second corresponding image file does not match an identifier of a corresponding image file for any of the set of packages.

19. The non-transitory computer-readable medium of claim 17, wherein the identifier of the corresponding image file of each of the set of packages comprises a hash.

20. The non-transitory computer-readable medium of claim 15, wherein the image manifest does not reference the corresponding image file for each of the set of packages in an order.

* * * * *